United States Patent [19]

Joshi et al.

[11] 4,307,157

[45] Dec. 22, 1981

[54] TREATMENT OF TITANIUM DISULFIDE FOR BATTERY APPLICATIONS

[75] Inventors: Ashok V. Joshi, Monroe; Charles C. Liang, Clarence, both of N.Y.

[73] Assignee: Duracell International Inc., Bethel, Conn.

[21] Appl. No.: 137,692

[22] Filed: Apr. 7, 1980

[51] Int. Cl.³ .................... H01M 4/04; H01M 4/58
[52] U.S. Cl. ............................. 429/50; 429/218; 423/565
[58] Field of Search ............ 429/191, 218, 50; 423/565

[56] References Cited

U.S. PATENT DOCUMENTS

| | | | |
|---|---|---|---|
| 3,791,867 | 2/1974 | Broadhead et al. | 429/191 |
| 3,980,761 | 9/1976 | Thompson et al. | 423/565 |
| 4,007,055 | 2/1977 | Whittingham | 429/218 |
| 4,009,052 | 2/1977 | Whittingham | 429/191 |
| 4,060,667 | 11/1977 | Askew et al. | 429/191 |
| 4,084,046 | 4/1978 | Whittingham | 429/218 |

Primary Examiner—Donald L. Walton
Attorney, Agent, or Firm—Ronald S. Cornell; Israel Nissenbaum

[57] ABSTRACT

Commercially available titanium disulfide is treated with an oxidizing agent such as iodine ($I_2$) prior to use as a cathode material in an electrochemical cell with the treated titanium disulfide providing superior discharge characteristics.

6 Claims, 1 Drawing Figure

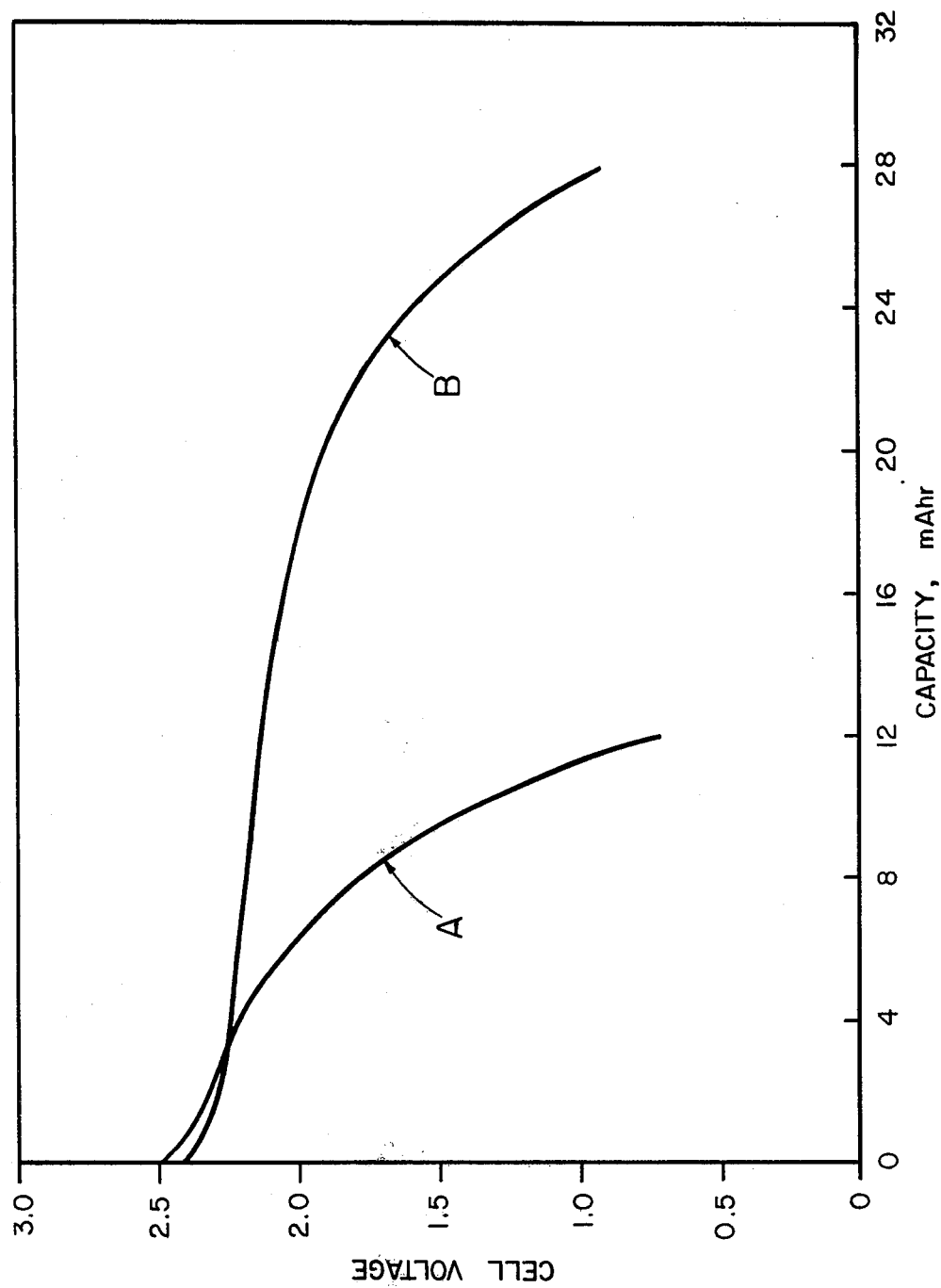

TREATMENT OF TITANIUM DISULFIDE FOR BATTERY APPLICATIONS

This invention relates to titanium disulfide for use as cathode materials in electrochemical cells and more particularly for use in solid state electrochemical cells.

Recently, high energy density electrochemical cells having lithium (or other active metal) anodes have utilized titanium disulfide (a layered compound) as cathodes thereof. However, titanium disulfide which is readily commercially available is generally non-stoichiometric ($TiS_{2-y}$; $0 \leq y \leq 0.2$) with increased deviations from stoichiometry providing progressively reduced discharge efficiency and as the deviations from stoichiometry increase there is an increased amount of excess titanium ions (of valences lower than the 4 of the titanium in the stoichiometric $TiS_2$) contained in the layered crystalline structure of the titanium disulfide.

It has been established that the cell reaction mechanism of a titanium disulfide cathode with, for example, a lithium anode is that of an intercalation of anode cations between the layers and is generally represented by the following reaction:

$$xLi + TiS_2 \rightarrow Li_xTiS_2 (0 < x \leq 1)$$

Thus, the excess titanium ions of the non-stoichiometric titanium disulfide reduces the amount of lithium ions which can be intercalated by both occupying sites and by reducing interlayer distances by van der Waal attractions and the capacity of the cell is therefore concomitantly reduced. Furthermore, the rate of the intercalation reaction is also reduced since paths for lithium ions are similarly reduced, thereby adversely affecting the discharge rate of the cell.

In order to enhance the effectiveness of titanium disulfide as a cathode material, Whittingham (U.S. Pat. No. 4,007,055) describes a method whereby the titanium disulfide may be initially made in the stoichiometric form. However, such method entails the initial reaction between elemental sulfur and titanium under stringent atmospheric and temperature conditions which are both complex and costly in their implementation.

It is an object of the present invention to provide a method by which cathodically inferior non-stoichiometric titanium disulfide is converted to a more cathodically desirable form of titanium disulfide.

It is a further object of the present invention to provide a solid state cell having such converted titanium disulfide in the cathode thereof.

These and other objects, features and advantages of the present invention will become more apparent from the following discussion as well as the figure of the drawing.

The single FIGURE in the drawing provides a graphic discharge comparison between untreated titanium disulfide and the converted titanium disulfide of the present invention.

Generally the present invention comprises the treatment of cathodically inferior non-stoichiometric titanium disulfide ($TiS_{2-y}$; $0 < y \leq 0.2$) with an oxidizing agent, such as iodine, whereby the titanium disulfide is converted into a cathodically superior form. The treatment of the titanium disulfide with the oxidizing agent generally comprises addition of the oxidizing agent to the titanium disulfide; thorough blending and/or grinding of the mixture to insure homogeneity and substantially complete conversion; and substantial removal of excess oxidizing agent and/or reaction products, which constitute impurities, from the mixture.

The amount of oxidizing agent, such as iodine, which is added should be at least 0.1% by weight and preferably between 5-15% and most preferably about 10%. Removal of the excess oxidizing agent and/or reaction products is preferably accomplished by evacuation at elevated temperatures. It is preferred that the evacuation be extended over a period of at least five minutes and more preferably a period of several hours to insure sufficient time for conversion and substantial removal of the excess oxidizing agent and/or reaction products.

It is postulated that the oxidizing agent reacts with the excess titanium ions of lower valency than 4. Thereafter excess oxidizing agent and/or reaction products are removed during the evacuation procedure thereby leaving the more stoichiometric titanium disulfide. In accordance with such theory the oxidizing agent should react with the excess titanium ions, but not the rest of the titanium whereby sulfur is replaced. Furthermore, reaction products should either not affect the titanium disulfide intercalation or should be easily removable during procedures such as evacuation. Iodine is the preferred oxidizing agent since it does not replace sulfur in the titanium disulfide, is easily removable by evacuation and the titanium tetraiodide (the expected reaction product) is similarly easily removable.

It is preferred that the temperature during the evacuation procedure be maintained above room temperature to speed up removal but below 550° C. in order to prevent decomposition of the titanium disulfide with sulfur vaporization and the reformation of the non-stoichiometric form of the titanium disulfide. An evacuation temperature of about 200° C. is most preferred in providing the removal, as required, in a reasonable period of time.

The treated titanium disulfide is thereafter used as a cathode material in an electrochemical cell, with such titanium disulfide being particularly useful in solid state electrochemical cells wherein the anode, cathode and electrolyte are all solid during cell operation. Titanium disulfide and in particular the converted titanium disulfide of the present invention has, in addition to its cathodically dischargeable properties, the property of being both electronically and ionically conductive whereby the use of capacity robbing inert conductive materials such as graphite may be eliminated from the cathode. In solid state cells there is the additional benefit that the normally used inert ionic conductors may be also dispensed with.

The converted or treated titanium disulfide of the present invention is useful as a cathode material in non-aqueous fluid organic or inorganic electrolyte cells such as those described by Whittingham in U.S. Pat. No. 4,007,055 and solid state cells having anodes made of lithium or other alkali and alkaline earth metals and aluminum.

Titanium disulfide has been found to be completely stable with solid electrolytes such as those comprising LiI and LiI with $Al_2O_3$ and/or LiOH which have been utilized in solid state lithium cells. Accordingly, the titanium sulfide containing cathodes are useful in such solid state cells which are designed for average lifetimes of ten years or more without detrimental self discharge reactions.

The following examples are provided as illustrating the efficacy of the treated $TiS_2$ of the present invention, as cathode material in a solid state electrochemical cell, when compared to the untreated $TiS_2$. It is understood that the specifics contained in the examples are for illustrative purposes only and are not to be taken as limitations on the present invention. Unless otherwise indicated all parts are parts by weight.

EXAMPLE 1 (untreated $TiS_{2-y}$)

A solid state cell is constructed having an anode of lithium with a geometric area of 1.48 cm$^2$, a solid electrolyte of LiI, Al$_2$O$_3$ and LiOH, and a cathode of untreated $TiS_{2-y}$; $0<y\leq0.2$, having a geometric area of 1.77 cm$^2$ and weighing 100 mg. The cell has excess lithium, is cathode limited and is discharged at 72° C. under a constant load of 20 kohms with the discharge curve of the cell designated as 'A' in the FIGURE of the drawing. The cell has a discharge capacity of about 12 mAhrs. to 1 volt.

EXAMPLE 2 (treated $TiS_{2-y}$)

A cell is constructed which is identical to the cell in Example 1 but in which the $TiS_{2-y}$ is pretreated by mixture with 10% I$_2$ and evacuation for 4 hours at 200° C. The cell is discharged under the same conditions as the cell in Example 1 (72° C. under constant load of 20 kohms) and the discharge curve is designated as 'B' in the FIGURE of the drawing. The cell has a discharge capacity of about 28 mAhrs to 1 volt, more than twice the capacity of the cell of example 1, having the untreated $TiS_{2-y}$ as the cathode material. It is understood that the foregoing examples are only illustrative of the present invention with changes in the treatment of the non-stoichiometric titanium disulfide and the materials used in such treatment as well as varying cells made with such titanium disulfide as cathode materials thereof being within the scope of the present invention as defined in the following claims.

What is claimed is:

1. A method for treating non-stoichiometric titanium disulfide to improve the electrochemical discharge characteristics thereof comprising the steps of:
   (a) mixing said non-stoichiometric titanium disulfide with at least 0.1% by weight of an oxidizing agent which does not decompose said titanium disulfide,
   (b) substantially removing impurities from said titanium disulfide, and (c) thereafter using said titanium disulfide as a cathode material in an electrochemical cell.

2. The method of claim 1 wherein said removal is effected by evacuation for at least five minutes.

3. The method of claim 2 wherein said evacuation is effected at a temperature below 550° C.

4. The method of claim 1 wherein said oxidizing agent comprises iodine.

5. The method of claim 4 wherein said iodine comprises between 5 and 15% by weight of said non-stoichiometric titanium disulfide.

6. A method for treating non-stoichiometric titanium disulfide to improve the electrochemical discharge characteristics thereof comprising the steps of:
   (a) mixing said non-stoichiometric titanium disulfide with at least 0.1% by weight of iodine,
   (b) evacuating said titanium disulfide at a temperature between room temperature and 550° C. and
   (c) thereafter using said titanium disulfide as a cathode material in an electrochemical cell.

* * * * *